(12) United States Patent
Hagino et al.

(10) Patent No.: US 11,258,138 B2
(45) Date of Patent: Feb. 22, 2022

(54) BATTERY AND METHOD OF MANUFACTURING BATTERY

(71) Applicant: TOYOTA JIDOSHA KABUSHIKI KAISHA, Toyota (JP)

(72) Inventors: Tomotaka Hagino, Toyota (JP); Yoichi Naruse, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 405 days.

(21) Appl. No.: 16/289,856

(22) Filed: Mar. 1, 2019

(65) Prior Publication Data

US 2019/0273240 A1 Sep. 5, 2019

(30) Foreign Application Priority Data

Mar. 2, 2018 (JP) .............................. JP2018-037946

(51) Int. Cl.
| | |
|---|---|
| *B23K 26/24* | (2014.01) |
| *H01M 2/26* | (2006.01) |
| *H01M 2/30* | (2006.01) |
| *H01M 2/08* | (2006.01) |
| *H01M 2/02* | (2006.01) |
| *H01M 50/531* | (2021.01) |
| *B23K 26/323* | (2014.01) |
| *B23K 20/24* | (2006.01) |

(Continued)

(52) U.S. Cl.
CPC ........... *H01M 50/531* (2021.01); *B23K 20/10* (2013.01); *B23K 20/2333* (2013.01); *B23K 20/24* (2013.01); *B23K 26/24* (2013.01); *B23K 26/323* (2015.10); *H01M 50/116* (2021.01); *H01M 50/183* (2021.01); *H01M 50/543* (2021.01); *B23K 2101/36* (2018.08); *B23K 2103/10* (2018.08); *B23K 2103/12* (2018.08); *B23K 2103/18* (2018.08)

(58) Field of Classification Search
CPC ............ H01M 50/531; H01M 50/116; H01M 50/183; H01M 50/543; H01M 50/172; H01M 50/528; H01M 50/147; B23K 20/10; B23K 20/2333; B23K 20/24; B23K 26/24; B23K 26/323; B23K 2101/36; B23K 2103/10; B23K 2103/12; B23K 2103/18; B23K 2101/38; Y02E 60/10

See application file for complete search history.

(56) References Cited

U.S. PATENT DOCUMENTS

| | | | | |
|---|---|---|---|---|
| 2011/0287300 | A1* | 11/2011 | Byun ................. | H01M 50/543 429/158 |
| 2012/0028088 | A1* | 2/2012 | Hattori ................. | H01M 50/10 429/53 |

(Continued)

FOREIGN PATENT DOCUMENTS

| | | |
|---|---|---|
| JP | 2013-161629 A | 8/2013 |
| JP | 2014-011073 A | 1/2014 |

(Continued)

*Primary Examiner* — Kaity V Chandler
(74) *Attorney, Agent, or Firm* — Sughrue Mion, PLLC

(57) ABSTRACT

A welding step involves solid-state welding together an external terminal and a seat portion of an internal terminal by causing the external terminal or the internal terminal to vibrate while detaching an insulator from the external terminal in at least a region surrounding the seat portion and pressing the external terminal against the seat portion.

7 Claims, 13 Drawing Sheets

(51) Int. Cl.
*B23K 20/233* (2006.01)
*B23K 20/10* (2006.01)
*H01M 50/116* (2021.01)
*H01M 50/183* (2021.01)
*H01M 50/543* (2021.01)
*B23K 101/36* (2006.01)
*B23K 103/10* (2006.01)
*B23K 103/12* (2006.01)
*B23K 103/18* (2006.01)

(56) References Cited

U.S. PATENT DOCUMENTS

| | | | |
|---|---|---|---|
| 2012/0214050 A1* | 8/2012 | Kim | H01M 10/0468 |
| | | | 429/179 |
| 2014/0004408 A1 | 1/2014 | Ehara | |
| 2015/0180007 A1* | 6/2015 | Ohta | H01M 50/15 |
| | | | 429/179 |
| 2015/0214537 A1* | 7/2015 | Nakamura | H01M 50/578 |
| | | | 429/211 |
| 2015/0214568 A1* | 7/2015 | Murakami | B23K 20/10 |
| | | | 429/209 |
| 2016/0293929 A1* | 10/2016 | Kitaoka | H01M 10/0431 |
| 2016/0336579 A1 | 11/2016 | Nemoto et al. | |
| 2016/0372722 A1* | 12/2016 | Yoshida | H01M 50/20 |
| 2017/0117510 A1 | 4/2017 | Takasu et al. | |

FOREIGN PATENT DOCUMENTS

| | | |
|---|---|---|
| JP | 2014-112552 A | 6/2014 |
| JP | 2017-084585 A | 5/2017 |
| JP | 2017-183058 A | 10/2017 |
| KR | 1020160134517 A | 11/2016 |

\* cited by examiner

BATTERY AND METHOD OF MANUFACTURING BATTERY

CROSS REFERENCE TO RELATED APPLICATIONS

The present application claims priority from Japanese Patent Application No. 2018-037946 filed on Mar. 2, 2018, which is incorporated by reference herein in its entirety.

BACKGROUND

The present disclosure relates to a battery and a method of manufacturing a battery.

JP 2014-11073 A discloses the following technique. A shaft portion of an internal terminal that penetrates through a battery case and an external terminal is riveted to the external terminal, and thereafter, the outer peripheral edge of the riveted portion is laser-welded to the external terminal. JP 2017-84585 A discloses that a bead portion is provided on the outer peripheral edge of the riveted portion by laser welding.

SUMMARY

A welded portion of the internal terminal and the external terminal tends to show lower electrical resistance than other contact parts between the internal terminal and the external terminal. Accordingly, the welded portion may be a primary conductive path between the internal terminal and the external terminal. When the welded portion is located at the outer peripheral edge of the riveted portion, it is possible that, for example, extraneous matters or the like may make contact with the welded portion. Because it is desired to maintain the quality of the conductive path between the internal terminal and the external terminal at high level, it is desired to prevent the welded portion between the internal terminal and the external terminal from making contact with such extraneous matters. In addition, to join the internal terminal and the external terminal by laser welding, relatively high-cost equipment, such as a laser welding machine, is necessary. Accordingly, it is proposed herein to provide a battery that has a totally novel structure and a method of manufacturing the battery.

According to this disclosure, an embodiment of the method of manufacturing a battery includes a step of preparing a battery case component, a step of preparing a gasket, a step of preparing an internal terminal, a step of preparing an insulator, a step of preparing an external terminal, an assembling step, and a welding step.

The battery case component includes a mounting hole. The gasket includes a tubular portion attachable to the mounting hole. The internal terminal includes a seat portion attachable to the tubular portion. The insulator includes a first through hole attachable to the tubular portion. The external terminal is to be disposed on the insulator, and includes a portion that overlaps the seat portion. In the assembling step, the internal terminal, the gasket, the battery case component, the insulator, and the external terminal are assembled together. In the assembling step, the tubular portion of the gasket is fitted to the mounting hole of the battery case component, the seat portion of the internal terminal is fitted to the tubular portion of the gasket, the insulator is disposed on an outer surface of the battery case component, and the external terminal is disposed on the insulator so as to overlap the seat portion. In the welding step, the seat portion and the external terminal are solid-state welded together by causing the external terminal or the internal terminal to vibrate while detaching the insulator from the external terminal in at least a region surrounding the seat portion and pressing the external terminal against the seat portion of the internal terminal. This method makes it possible to obtain consistency in the quality of solid-state welding between the external terminal and the seat portion of the internal terminal.

For example, the external terminal may include a second through hole formed in a vicinity of a portion of the external terminal that overlaps the seat portion. In this case, in the welding step, the insulator may be pressed down through the second through hole to detach the insulator from the external terminal.

The external terminal may include a second through hole formed in a vicinity of the portion of the external terminal that overlaps the seat portion, and the insulator may include a protrusion protruding into the second through hole. In this case, in the assembling step, the protrusion of the insulator may be inserted into the second through hole formed in the vicinity of the portion of the external terminal that overlaps the seat portion. Also, in the welding step, the protrusion may be pressed down to detach the insulator from the external terminal in the region surrounding the seat portion.

The protrusion may protrude from the second through hole with the external terminal being pressed against the seat portion of the internal terminal.

The external terminal may include a thinned portion having a reduced thickness and provided in a vicinity of the portion of the external terminal that overlaps the seat portion. In this case, in the welding step, the thinned portion may be pressed down to detach the insulator from the external terminal in the region surrounding the seat portion.

It is also possible that the internal terminal prepared in the step of preparing an internal terminal may include a shaft portion rising from the seat portion, and that the external terminal prepared in the step of preparing an external terminal may include an insertion hole through which the shaft portion is inserted. In this case, in the assembling step, the external terminal may be disposed on the insulator so that the shaft portion is inserted through the insertion hole. The method may further include, after or during the welding step, the step of fastening the shaft portion to a region around the insertion hole. After the fastening step, the insulator may no longer be detached from the external terminal in at least the region surrounding the seat portion.

In the welding step, ultrasonic vibrations may be applied to the internal terminal or the external terminal while clamping the internal terminal and the external terminal with a horn and an anvil, and pressing the external terminal and the seat portion of the internal terminal against each other.

In an embodiment disclosed herein, a battery includes a battery case component including a mounting hole, an internal terminal, an external terminal, and an insulating member interposed between the battery case component and the external terminal and between the battery case component and the internal terminal. The internal terminal includes a base portion and a seat portion protruding from the base portion. The base portion is overlapped on an inside of the battery case component with the insulating member being interposed between the base portion and the inside of the battery case component. The seat portion is inserted through the mounting hole with the insulating member being interposed between the seat portion and the mounting hole, and is attached to the battery case component. The external terminal includes a welded portion and a through hole. The welded portion is overlapped on the seat portion inserted through the mounting hole and is welded to the internal terminal. The through hole is formed in a vicinity of a portion of the external terminal that overlaps the seat portion. The insulating member includes a protrusion protruding into the through hole.

In an embodiment disclosed herein, a battery includes a battery case component including a mounting hole, an internal terminal, an external terminal, and an insulating member interposed between the battery case component and the external terminal and between the battery case component and the internal terminal. The internal terminal includes a base portion and a seat portion protruding from the base portion. The base portion is overlapped on an inside of the battery case component with the insulating member being interposed between the base portion and the inside of the battery case component. The seat portion is inserted through the mounting hole with the insulating member being interposed between the seat portion and the mounting hole, and is attached to the battery case component. The external terminal includes a welded portion and a thinned portion. The welded portion is overlapped on the seat portion inserted through the mounting hole and is welded to the internal terminal. The thinned portion has a reduced thickness, and is provided in a vicinity of a portion of the external terminal that overlaps the seat portion.

The internal terminal may further include a shaft portion rising from the seat portion, and the external terminal may further include an insertion hole through which the shaft portion is inserted. In this case, the shaft portion may be inserted through the insertion hole and fastened to a region around the insertion hole.

DETAILED DESCRIPTION

Figure 1:
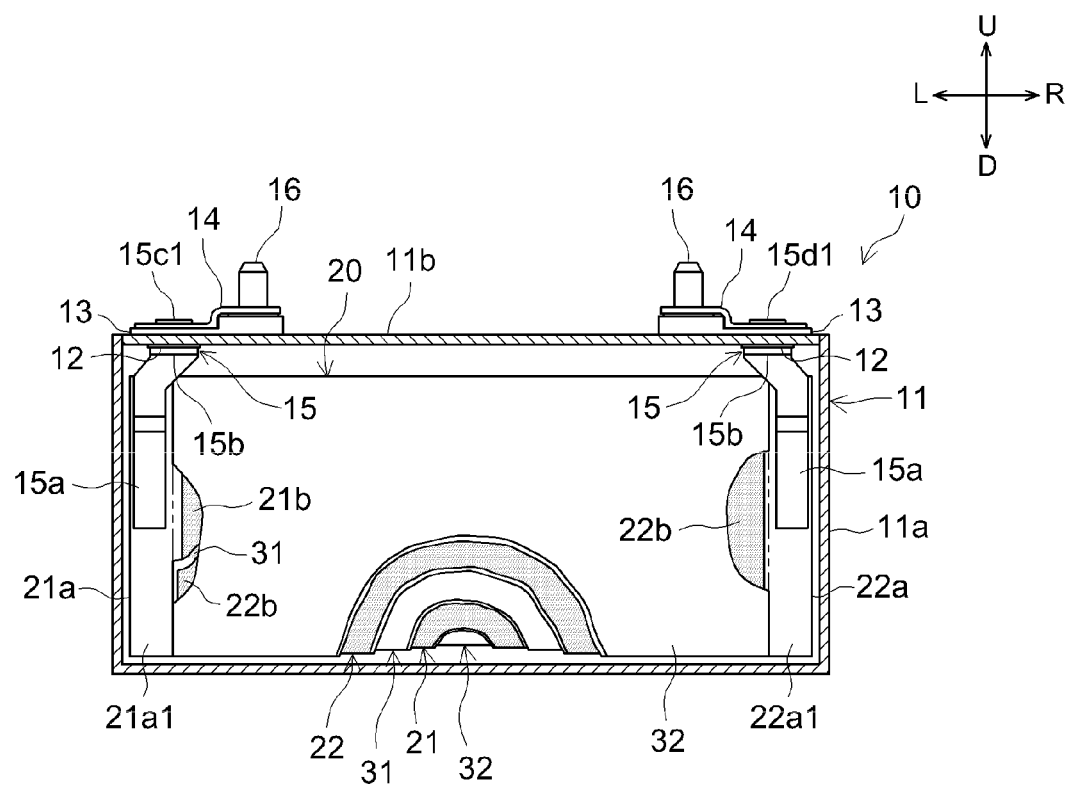
FIG. 1 is a partial cross-sectional view of a sealed battery 10 according to one embodiment of the present disclosure.

Hereinbelow, embodiments of a battery and a method of manufacturing the battery according to the present disclosure will be described in detail. It should be noted, however, that the embodiments described herein are, of course, not intended to limit the present invention. The present invention is not limited to the embodiments described herein unless specifically stated otherwise. The drawings are depicted schematically and do not necessarily reflect actual objects. The features and components that exhibit the same effects are denoted by the same reference symbols as appropriate, and the description thereof will not be repeated. Arrows designated as U, D, L R, F, and Rr in the drawings represent respective directions, up, down, left, right, front, and rear.

Figure 2:
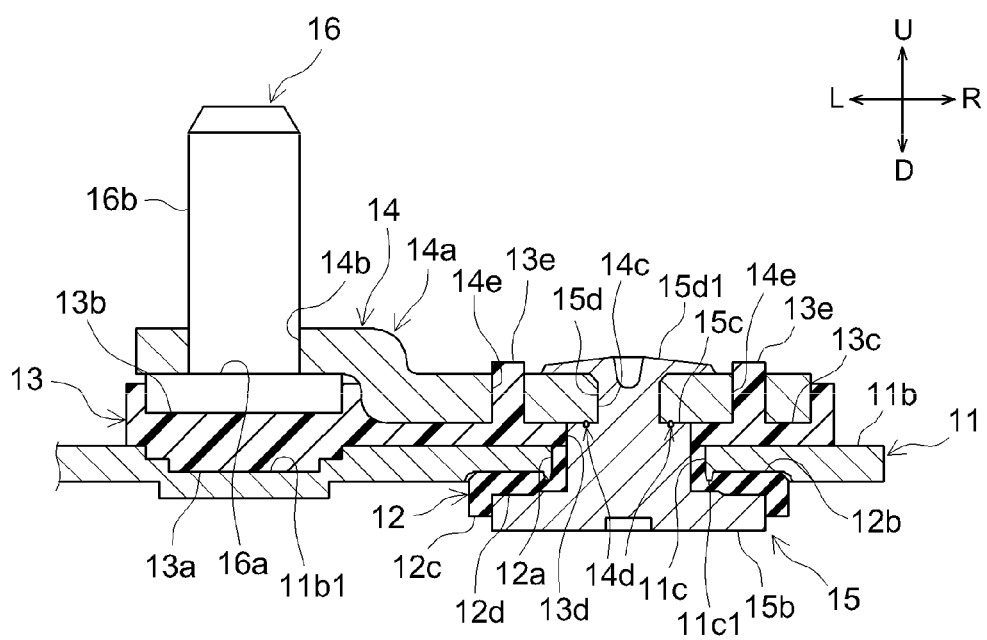
FIG. 2 is a cross-sectional view illustrating a portion where an external terminal 14 and an internal terminal 15 are fitted to a battery case 11.

Here, embodiments of a battery and a method of manufacturing the battery are described using a sealed battery 10 shown in FIGS. 1 and 2 as an example.

FIG. 1 is a partial cross-sectional view of a sealed battery 10 according to one embodiment of the present disclosure. FIG. 1 depicts the interior of the sealed battery 10 that is exposed along one wide side surface of a battery case 11 in substantially a rectangular parallelepiped shape. FIG. 2 is a cross-sectional view illustrating a portion where an external terminal 14 and an internal terminal 15 are fitted to a battery case 11. As illustrated in FIGS. 1 and 2, the sealed battery 10 includes the battery case 11, a gasket 12, an insulator 13, the external terminal 14, the internal terminal 15, a connecting terminal 16, and an electrode assembly 20.

The electrode assembly 20 is covered with an insulating film (not shown) and is enclosed in the battery case 11. The electrode assembly 20 includes a positive electrode sheet 21 serving as a positive electrode element, a negative electrode sheet 22 serving as a negative electrode element, and separator sheets 31 and 32 each serving as a separator. Each of the positive electrode sheet 21, the first separator sheet 31, the negative electrode sheet 22, and the second separator sheet 32 is a long strip-shaped member.

The positive electrode sheet 21 includes a positive electrode current collector foil 21a (for example, an aluminum foil) having a predetermined width and a predetermined thickness, a positive electrode active material layer 21b containing a positive electrode active material, and an uncoated portion 21a1 defined along one lateral edge of the positive electrode current collector foil 21a with a constant width. The positive electrode active material layer 21b is formed on both faces of the positive electrode current collector foil 21a, except for the uncoated portion 21a1. In a lithium-ion secondary battery, the positive electrode active material is a material that releases lithium ions during charge and absorbs lithium ions during discharge, such as lithium-transition metal composite material. Generally, other than the lithium-transition metal composite material, various materials have been proposed for use as the positive electrode active material, and the positive electrode active material is not limited to a particular material.

The negative electrode sheet 22 includes a negative electrode current collector foil 22a (copper foil herein) having a predetermined width and a predetermined thickness, a negative electrode active material layer 22b containing a negative electrode active material, and an uncoated portion 22a1 defined along one lateral edge of the negative electrode current collector foil 22a with a constant width. The negative electrode active material layer 22b is formed on both faces of the negative electrode current collector foil 22a, except for the uncoated portion 22a1. In a lithium-ion secondary battery, for example, the negative electrode active material is a material that absorbs lithium ions during charge and releases the absorbed lithium ions during discharge, such as graphite. Generally, other than graphite, various materials have been proposed for use as the negative electrode active material, and the negative electrode active material is not limited to a particular material.

Each of the separator sheets 31 and 32 may be formed of, for example, an electrolyte permeable porous resin sheet with required heat resistance. Various proposals have been made about the separator sheets 31 and 32, and there is no particular restriction on the separator sheets 31 and 32.

Here, the negative electrode active material layer 22b is formed, for example, so as to be wider than the positive electrode active material layer 21b. The width of the separator sheets 31 and 32 is wider than the width of the negative electrode active material layer 22b. The uncoated portion 21a1 of the positive electrode current collector foil 21a and the uncoated portion 22a1 of the negative electrode current collector foil 22a are arranged at laterally opposite ends. The positive electrode sheet 21, the first separator sheet 31, the negative electrode sheet 22, and the second separator sheet 32 are aligned longitudinally, stacked one on another, and wound together. The negative electrode active material layer 22b covers the positive electrode active material layer 21b with the separator sheets 31 and 32 interposed therebetween. The negative electrode active material layer 22b is covered with the separator sheets 31 and 32. The uncoated portion 21a1 of the positive electrode current collector foil 21a protrudes from one of the lateral edges of the separator sheets 31 and 32. The uncoated portion 22a1 of the negative electrode current collector foil 22a protrudes from the other one of the lateral edges of the separator sheets 31 and 32.

As illustrated in FIG. 1, the electrode assembly 20 is formed in a flattened shape along one plane containing the winding axis so that it can be enclosed in a case main body 11a of the battery case 11. Along the winding axis of the electrode assembly 20, the uncoated portion 21a1 of the positive electrode current collector foil 21a is disposed at one end, and the uncoated portion 22a1 of the negative electrode current collector foil 22a is disposed at the opposite end. The uncoated portion 21a1 of the positive electrode current collector foil 21a and the uncoated portion 22a1 of the negative electrode current collector foil 22a are attached to respective internal terminals 15, which are respectively attached to opposite longitudinal end portions of a lid 11b. The electrode assembly 20 is attached to the internal terminals 15, which are attached to the lid 11b, in this manner, and is enclosed in the battery case 11.

The battery case 11 has a flat prismatic housing region. The battery case 11 includes the case main body 11a and the lid 11b. The battery case may be made of aluminum or aluminum alloy, such as 1000 series aluminum alloy or 3000 series aluminum alloy. In this embodiment, the case main body 11a has a substantially flat rectangular parallelepiped shape, and it has an opening in one face thereof that has longer sides and shorter sides. The lid 11b is a plate-shaped member that has a shape corresponding to the opening of the case main body 11a so as to be fitted to the opening. At opposite longitudinal end portions of the lid 11b, mounting holes 11c (see FIG. 2) are formed for mounting the external terminals 14 and the internal terminals 15. In this embodiment, a protrusion 11c1 protruding inward of the lid 11b is provided at the rim of the mounting hole 11c.

As illustrated in FIG. 2, the battery disclosed herein includes a battery case component (the lid 11b in this embodiment), an internal terminal 15, an external terminal 14, and an insulating member (12, 13). Here, the insulating member is interposed between the lid 11b and the internal terminal 15 and between the lid 11b and the external terminal 14, the lid 11b serving as the battery case component. In this embodiment, the insulating member includes a gasket 12 and an insulator 13.

Herein, as illustrated in FIGS. 1 and 2, the internal terminal 15 includes a lead portion 15a, a base portion 15b, a seat portion 15c, and a shaft portion 15d.

As illustrated in FIGS. 1 and 2, the base portion 15b is a portion of the internal terminal 15 that is lapped over the gasket 12 inside the lid 11b. The base portion 15b is attached to the lid 11b with the gasket 12 interposed between the base portion 15b and the lid 11b. The lead portion 15a is a portion of the internal terminal 15 that extends from the base portion 15b toward the inside of the battery case 11. Referring to FIG. 1, the lead portion 15a of the internal terminal 15 that is on the left side is welded to the uncoated portion 21a1 of the positive electrode current collector foil 21a of the electrode assembly 20. The lead portion 15a of the internal terminal 15 that is on the right side is welded to the uncoated portion 22a1 of the negative electrode current collector foil 22a of the electrode assembly 20. The seat portion 15c protrudes from the base portion 15b. The seat portion 15c is inserted through the mounting hole 11c of the lid 11b and fitted to the lid 11b, with the gasket 12 interposed between them. The shaft portion 15d rises from a central part of the seat portion 15c. Herein, the rising portion of the shaft portion 15d (that is, the central part of the base portion 15c) may not necessarily be at the absolute center of the seat portion 15c. The shaft portion 15d may be off the center of the seat portion 15c.

The gasket 12 is interposed between the internal terminal 15 and the mounting hole 11c of the lid 11b. The gasket 12 guarantees sufficient sealing performance of the mounting hole 11c of the lid 11b and also provides electrical insulation between the lid 11b and the internal terminal 15. The gasket 12 is composed of a resin member having desired elasticity. An example of material usable for the gasket 12 is tetrafluoroethylene-perfluoroalkyl vinyl ether copolymer (also referred to as PFA).

In this embodiment, the gasket 12 includes a tubular portion 12a, a flange portion 12b, a surrounding portion 12c, and a retaining portion 12d. The tubular portion 12a is a portion of the gasket 12 that protrudes from the flange portion 12b. The seat portion 15c and the shaft portion 15d of the internal terminal 15 are inserted through the tubular portion 12a. The tubular portion 12a is fitted to the inner circumferential surface of the mounting hole 11c of the lid 11b. The tubular portion 12a is has an inner diameter that is substantially the same size as the outer diameter of the seat portion 15c of the internal terminal 15 and also has an outer diameter that is substantially the same size as the inner diameter of the mounting hole 11c. The flange portion 12b extends radially from one end of the tubular portion 12a. The flange portion 12b is a plate-shaped member that is to be fitted to the inner side surface of the lid 11b. The surrounding portion 12c extends from the peripheral edge of the flange portion 12b opposite the tubular portion 12a. The retaining portion 12d is provided to be the lower surface of the gasket 12. The retaining portion 12d includes a recess that corresponds to the shape of the base portion 15b of the internal terminal 15, which will be detailed later. The retaining portion 12d is a portion of the gasket 12 on which the base portion 15b is positioned.

As illustrated in FIG. 2, the gasket 12 is fitted to the seat portion 15c of the internal terminal 15 and is mounted into the mounting hole 11c of the lid 11b. In this case, the seat portion 15c protrudes from the mounting hole 11c of the lid 11b, and the insulator 13 is fitted thereto outside the lid 11b. The height of the seat portion 15c of the internal terminal 15 is adjusted so that the seat portion 15c protrudes from the lid 11b by a dimension corresponding to the thickness of the insulator 13, under the condition that the tubular portion 12a of the gasket 12 is fitted to the seat portion 15c and also the seat portion 15c is fitted in the mounting hole 11c of the lid 11b. The seat portion 15c is fitted into the mounting hole 11c of the lid 11b with the tubular portion 12a of the gasket 12 being attached to the seat portion 15c. The shaft portion 15d of the internal terminal 15 rises from a central part of the seat portion 15c. The tip end 15d1 of the shaft portion 15d of the internal terminal 15 is crushed and fastened to the outside of the external terminal 14 in a region around the insertion hole 14c. Note that FIG. 2 depicts the shaft portion 15d of the internal terminal 15 that has been crushed and fastened. The shaft portion 15d of the internal terminal 15 that has not yet been fastened is in a substantially columnar shape (see FIG. 3).

The insulator 13 is a member that is disposed on an outside of the lid 11b to provide electrical insulation between the lid 11b and the external terminal 14 as well as between the lid 11b and the connecting terminal 16. The insulator 13 is composed of a resin member. Examples of materials usable for the insulator 13 include polypropylene (also referred to as PP), polypropylene (also referred to as PE), and polyphenylene sulfide (also referred to as PPS).

In this embodiment, the lower surface of the insulator 13 is provided with a protruding portion 13a, as illustrated in FIG. 2. The protruding portion 13a is fitted into a recess 11b1 of the lid 11b. The upper surface of the insulator 13 is provided with a recess 13b, in which the connecting terminal 16 is to be disposed, and a recess 13c, in which the external terminal 14 is to be fitted. In the recess 13c, in which the external terminal 14 is fitted, a through hole 13d is formed at a position that corresponds to the mounting hole 11c formed in the lid 11b. The through hole 13d has substantially the same shape as that of the seat portion 15c so that the seat portion 15c of the internal terminal 15 can be inserted therethrough. The through hole 13d is attached to the seat portion 15c of the internal terminal 15, which protrudes from the mounting hole 11c of the lid 11b, and the insulator 13 is fitted so as to cover the lid 11b. In the upper surface of the insulator 13, protrusions 13e are provided in a region surrounding the through hole 13d. Each of the protrusions 13e is a part that is to be fitted to a through hole 14e of the external terminal 14. Herein, the through hole 13d of the insulator 13 is referred to as a "first through hole" when appropriate, in order to distinguish the through hole 13d from the through hole 14e of the external terminal 14. The through hole 14e of the external terminal 14 is referred to as a "second through hole" when appropriate, in order to distinguish the through hole 14e from the through hole 13d of the insulator 13.

The external terminal 14 and the connecting terminal 16 are fitted to the outside of the lid 11b with the insulator 13 interposed therebetween. As illustrated in FIG. 2, the outer surface of the lid 11b is formed with a recess 11b1 that is recessed corresponding to the location at which the connecting terminal 16 is to be fitted. The external terminal 14, the internal terminal 15, and the connecting terminal 16 may be made of materials that can withstand the potentials respectively required for the positive electrode side and the negative electrode side. For example, for the positive electrode side, it is possible to use aluminum or aluminum alloys, such as 1000 series aluminum alloys, 3000 series aluminum alloys, and 6000 series aluminum alloys. For the negative electrode side, it is possible to use copper or copper alloys, such as 1000 series copper alloys.

The external terminal 14 includes a welded portion 14d and a through hole 14e. Here, the welded portion 14d is a portion of the external terminal 14 that is welded to the internal terminal 15, which is within a portion of the external terminal 14 that overlaps the seat portion 15c of the internal terminal 15 that is inserted through the mounting hole 11c of the lid 11c. The through hole 14e is formed in a vicinity of the portion of the external terminal 14 that overlaps the seat portion 15c. A protrusion 13e protruding from the upper surface of the insulator 13 serving as an insulating member is fitted into the through hole 14e. In this embodiment, the protrusion 13e has a required height such that the protrusion 13e can protrude from the through hole 14e, with the external terminal 14 being pressed against the seat portion 15c of the internal terminal 15.

In this embodiment, as illustrated in FIG. 2, the external terminal 14 is overlapped on the outside of the lid 11b with the insulator 13 interposed between the external terminal 14 and the lid 11b. In this embodiment, the external terminal 14 includes an insertion hole 14c through which the shaft portion 15d of the internal terminal 15 is inserted. A region around the insertion hole 14c overlaps the seat portion 15c. The external terminal 14 and the internal terminal 15 are welded to each other in a portion of the external terminal 14 that overlaps the seat portion 15c of the internal terminal 15. Although it is possible to weld all around the portion of the external terminal 14 that overlaps the seat portion 15c, it is preferable to weld at least a portion of the circumferential portion of the external terminal 14 that overlaps the seat portion 15c. Herein, within the portion that overlaps the seat portion 15c in a region around the insertion hole 14c, the portion where the external terminal 14 and the internal terminal 15 are welded together is referred to as a welded portion 14d. The welded portion 14d provides reliable electrical conduction between the external terminal 14 and the tip end 15d1 of the internal terminal 15.

The through hole 14e is formed in the external terminal 14 within the vicinity of the portion where the external terminal 14 is overlapped on the seat portion 15c. In this embodiment, the through hole 14e is formed at a position slightly away radially outward of the insertion hole 14c from the portion where the external terminal 14 is overlapped on the seat portion 15c, along the longitudinal axis of the lid 11b. In this embodiment, two through holes 14e are formed along the longitudinal axis of the lid 11b at respective two locations that sandwich the portion where the external terminal 14 is overlapped on the seat portion 15c. Formed between the through holes 14e is the insertion hole 14c, through which the shaft portion 15d of the internal terminal 15 is to be inserted.

The external terminal 14 is disposed on the insulator 13, which is disposed on the outside of the lid 11b. The external terminal 14 also retains the connecting terminal 16. The external terminal 14 is a plate-shaped member disposed along the longitudinal axis of the lid 11b. A step 14a is provided at a longitudinal central portion of the external terminal 14. An attachment hole 14b, which is to be attached to a shaft portion 16b of the connecting terminal 16, is formed at one side of the step 14a. The insertion hole 14c, through which the shaft portion 15d of the internal terminal 15 is to be inserted, is formed at the opposite side.

The connecting terminal 16 includes a flange portion 16a and a shaft portion 16b. The flange portion 16a is positioned and fitted into the recess 13b provided in the insulator 13, which is disposed on the outside of the lid 11b. Accordingly, the flange portion 16a and the recess 13b may desirably have corresponding shapes. The shaft portion 16b serves as an output terminal. For example, when a battery pack is constructed, a bus bar is attached to the shaft portion 16b. In the step of fitting the external terminal 14, the external terminal 14 is fitted onto the insulator 13. In this embodiment, the shaft portion 16b of the connecting terminal 16, which is disposed on the insulator 13, is passed through the attachment hole 14b of the external terminal 14. Then, the shaft portion 15d of the internal terminal 15, which is exposed above the insulator 13, is passed through the insertion hole 14c of the external terminal 14. Furthermore, the external terminal 14 is fitted on top of the insulator 13.

In this embodiment, after assembling the various parts as described above, the seat portion 15c of the internal terminal 15 and the overlapping portion of the external terminal 14 are welded together. Further, the tip end 15d1 of the shaft portion 15d of the internal terminal 15 is fastened to the external terminal 14.

In the battery disclosed herein, the internal terminal 15 and the external terminal 14 that are fitted onto the lid 11b, serving as the battery case component, are pressed so that they are clamped together while interposing the gasket 12 and the insulator 13 between the internal terminal 15 and the lid 11b and between the external terminal 14 and the lid 11b, and also the shaft portion 15d of the internal terminal 15 is deformed. That is, the tip end 15d1 of the shaft portion 15d of the internal terminal 15 is deformed and fastened to the external terminal 14. Thereby, the internal terminal 15, the gasket 12, the insulator 13, and the external terminal 14 are secured to the lid 11b of the battery case 11.

Thus, as illustrated in FIG. 2, the internal terminal 15 of the battery 10 includes the base portion 15b, the seat portion 15c, and the shaft portion 15d. The base portion 15b is overlapped on the inside of the lid 11b as the battery case component, with an insulating member (the gasket 12) interposed between the base portion 15b and the lid 11b. The seat portion 15c protrudes from the base portion 15b. The seat portion 15c is inserted through the mounting hole 11c and fitted to the lid 11b with insulating members (12, 13) interposed between them. The shaft portion 15d rises at a central part of the seat portion 15c. The external terminal 14 includes the insertion hole 14c and the welded portion 14d. The insertion hole 14c is a hole through which the shaft portion 15d of the internal terminal 15 is to be inserted. The welded portion 14d is a portion of the external terminal 14 that is overlapped on the seat portion 15c in the region around the insertion hole 14c and is welded to the internal terminal 15. Further, the shaft portion 15d of the internal terminal 15 is fastened to the external terminal 14.

In this battery 10, the external terminal 14 includes the welded portion 14d welded to the internal terminal 15 in the portion of the external terminal 14 that overlaps the seat portion 15c within the region around the insertion hole 14c. The welded portion 14d is formed on the back side of the external terminal 14, which means that the welded portion 14d is not exposed on the surface. As a result, extraneous matters do not easily come into contact with the welded portion 14d from outside, so it is easy to maintain the quality of the conductive path at high level. Moreover, the shaft portion 15d of the internal terminal 15 is fastened to the external terminal 14 in this embodiment. In other words, the internal terminal 15 is fastened to the external terminal 14 like a rivet. Therefore, it is easy to maintain the internal terminal 15 in such a state that the internal terminal 15 is fitted to the lid 11b, the gasket 12, the insulator 13, and the external terminal 14. As a result, even when an external force acts on the battery 10 such as to pull the welded portion 14d apart, the joint between the internal terminal 15 and the external terminal 14 is maintained by the welded portion 14d. Although not shown in the drawings, it is also possible that the outer circumferential edge of the shaft portion 15d of the internal terminal 15 that has been fastened to the external terminal 14 may be additionally welded to the external terminal 14 by, for example, laser welding. The welding in this manner joins the internal terminal 15 and external terminal 14 more firmly to each other. Furthermore, the reliability of the conductive path between the internal terminal 15 and the external terminal 14 is improved because the conductive path is formed on both the inside and the outside of the internal terminal 15 and the external terminal 14, although the manufacturing cost may be increased thereby.

In this embodiment, the external terminal 14 is welded to the internal terminal 15 by the welded portion 14d, which is provided on the back surface of the external terminal 14. This welded portion 14d shows low electrical resistance because the surface films of the internal terminal 15 and the external terminal 14 are melted therein, which means that the welded portion 14d may serve as a conductive path. This may shorten the conductive path between the internal terminal 15 and the external terminal 14 in comparison with conventional cases where the tip end of the shaft portion 15d of the internal terminal 15 is fastened to the region around the insertion hole 14c of the external terminal 14 and the circumferential edge of the fastened shaft portion 15d of the internal terminal 15 is welded to the external terminal 14. As a result, the structure in which the external terminal 14 is joined to the internal terminal 15 by the welded portion 14d provided on the back surface of the external terminal 14 may also contribute to reducing the battery resistance in the battery 10.

The following describes a method of manufacturing the above-described battery 10 and a welding method of the above-described welded portion 14d.

The method of manufacturing the battery 10 includes a step of preparing a battery case component (the lid 11b herein), a step of preparing the gasket 12, a step of preparing the internal terminal 15, a step of preparing the insulator 13, a step of preparing the external terminal 14, an assembling step, a welding step, and a fastening step.

Figure 3:
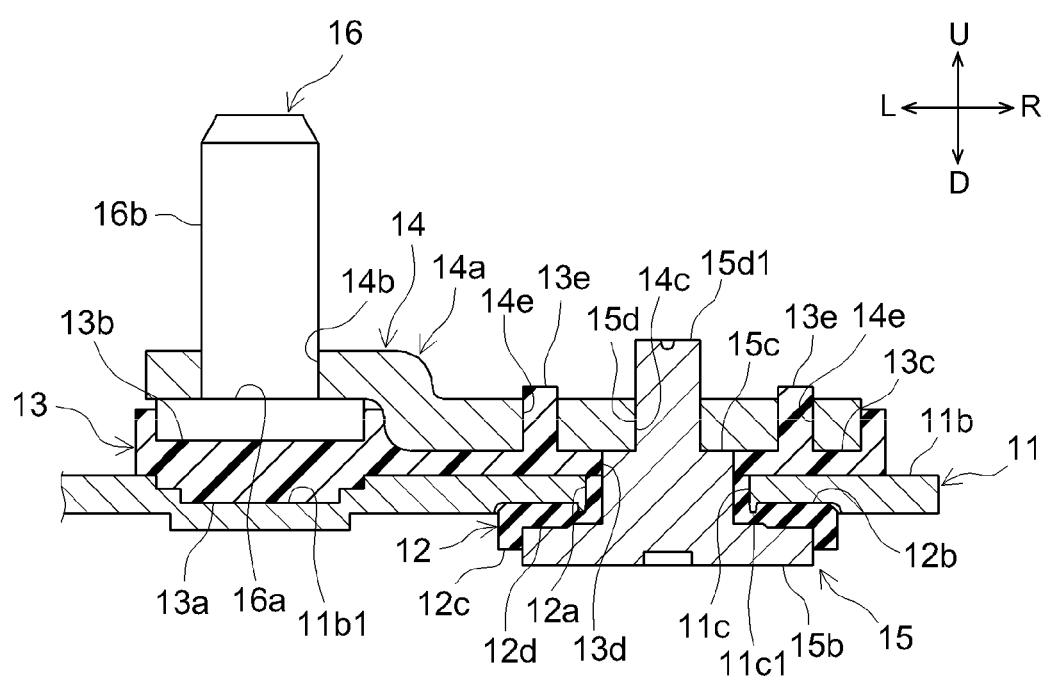
FIG. 3 is a cross-sectional view illustrating the internal terminal 15, a gasket 12, a lid 11b, an insulator 13, and the external terminal 14 that are assembled together in an assembling step.
Figure 4:
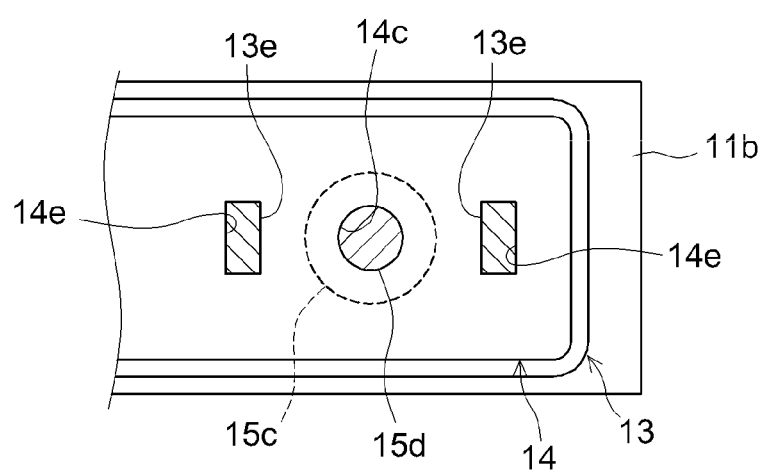
FIG. 4 is a plan view illustrating a region surrounding an insertion hole 14c of the external terminal 14 in the assembling step.
Figure 5:
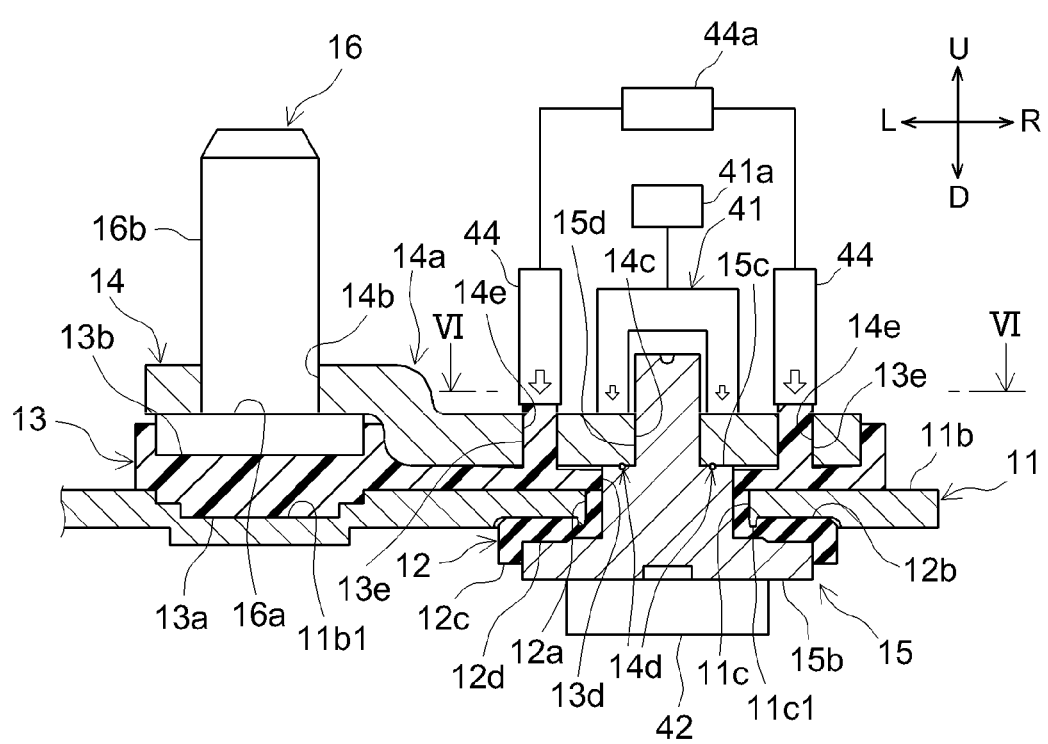
FIG. 5 is a cross-sectional view illustrating how the external terminal 14 is pressed against a seat portion 15c of the internal terminal 15 in a welding step.
Figure 6:
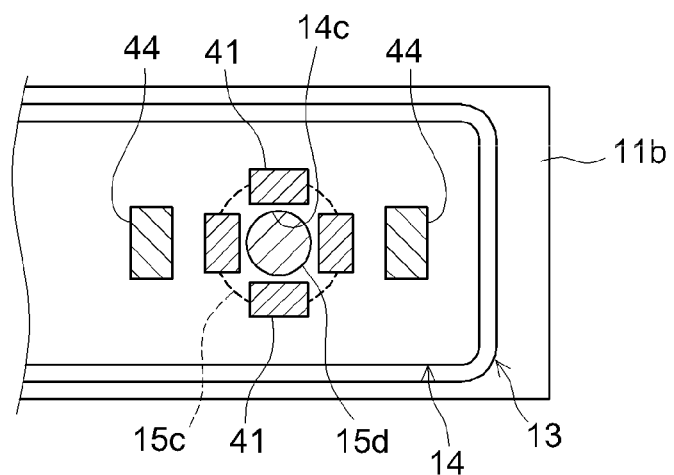
FIG. 6 is a partial cross-sectional view taken along line VI-VI in FIG. 5.

FIG. 3 is a cross-sectional view illustrating the internal terminal 15, the gasket 12, the lid 11b, the insulator 13, and the external terminal 14 that are assembled together in the assembling step. FIG. 4 is a plan view illustrating a region surrounding the insertion hole 14c of the external terminal 14 in the assembling step. FIG. 5 is a cross-sectional view illustrating how the external terminal 14 is pressed against the seat portion 15c of the internal terminal 15 in the welding step. FIG. 6 is a partial cross-sectional view taken along line VI-VI in FIG. 5. FIG. 6 shows a region surrounding the insertion hole 14c of the external terminal 14 in the welding step. FIGS. 3 and 5 show a cross section of the lid 11b along its longitudinal axis.

The lid 11b, serving as a battery case component prepared herein, may preferably be formed with a mounting hole 11c, as already described. The gasket 12 prepared here may preferably include the tubular portion 12a attachable to the mounting hole 11c, as already described. The internal terminal 15 prepared here may preferably include the seat portion 15c attachable to the tubular portion 12a and the shaft portion 15d rising at a central portion of the seat portion 15c, as already described. The insulator 13 prepared here includes the protrusion 13e and the through hole 13d to be fitted with the seat portion 15c. The external terminal 14 prepared here includes the insertion hole 14c through which the shaft portion 15d is to be inserted and the through hole 14e. Here, the protrusion 13e of the insulator 13 is provided in a vicinity of the through hole 13d, which is to be attached to the seat portion 15c. The through hole 14e of the external terminal 14 is formed corresponding to the position at which the protrusion 13e is provided. In this embodiment, the insulator 13 is provided with two protrusions 13e so as to sandwich the through hole 13d to be attached to the seat portion 15c along the longitudinal axis of the lid 11b. The external terminal 14 is formed with through holes 14e, the positions of which are adjusted so that the protrusions 13e can protrude therefrom.

In the assembling step, the internal terminal 15, the gasket 12, the lid 11b, the insulator 13, and the external terminal 14 are assembled together, as illustrated in FIG. 3. In the assembling step, for example, the tubular portion 12a of the gasket 12 is fitted onto the mounting hole 11c of the lid 11b, serving as a battery case component. The seat portion 15c of the internal terminal 15 is fitted into the tubular portion 12a of the gasket 12. The insulator 13 is disposed on the outer surface of the lid 11b while attaching the seat portion 15c to the through hole 13d. Further, when arranging the external terminal 14 on the insulator 13, the shaft portion 15d of the internal terminal 15 is inserted through the insertion hole 14c, and the protrusions 13e of the insulator 13 are inserted into the through holes 14e of the external terminal 14. Note that the procedure of assembling the internal terminal 15, the gasket 12, the lid 11b, the insulator 13, and the external terminal 14 in the assembling step is not limited to the one described above. For example, in the assembling step, it is also possible that the gasket 12, the lid 11b, the insulator 13, and the external terminal 14 may be fitted onto the internal terminal 15 in that order.

In the welding step, as illustrated in FIG. 5, for example, the internal terminal 15 and the external terminal 14 that are assembled together in the assembling step as described above are clamped by a horn 41 and an anvil 42 (supporting jig). In this embodiment, the horn 41 is put onto the upper surface of the external terminal 14, and the anvil 42 is put onto the lower surface of the base portion 15b of the internal terminal 15. Then, the external terminal 14 is pressed against the seat portion 15c of the internal terminal 15. As illustrated in FIG. 6, the horn 41 is pressed against four locations on the external terminal 14 around a region surrounding the insertion hole 14c through which the shaft portion 15d is inserted. The tip ends of the horn 41 are circumferentially uniformly arranged. In this embodiment, each of the edge faces of the horn 41 is in a rectangular shape. However, the horn 41 may have an edge face in a circular arc shape along the circumference around the region surrounding the insertion hole 14c, through which the shaft portion 15d is inserted.

The horn 41 is mounted to a press 41a equipped with a vibration generator. The vibration generator is a device that applies vibrations required for ultrasonic welding to the horn 41. The vibration generator may preferably incorporate, for example, a transducer or a booster. The anvil 42 is mounted so as to oppose the horn 41. In this embodiment, the anvil 42 is put onto the base portion 15b of the internal terminal 15 at a position opposite to the horn 41.

Further, as illustrated in FIG. 5, the protrusions 13e inserted through the through holes 14e of the external terminal 14 are pressed down, whereby the insulator 13 is elasticity deformed. This causes the insulator 13 to be detached from the external terminal 14 in a region surrounding the seat portion 15c. Each of the protrusions 13e may preferably be pressed down by, for example, a pressing member 44 of the press 44a. Whether the insulator 13 is detached from the external terminal 14 in the region surrounding the seat portion 15c may be determined by the reaction force that acts on the pressing member 44 of the press 44a.

When the external terminal 14 is pressed against the seat portion 15c of the internal terminal 15, the internal terminal 15, the gasket 12, the lid 11b, the insulator 13, and the external terminal 14 are brought into intimate contact with each other. In addition, in this embodiment, the protrusion 11c1 provided at the rim of the mounting hole 11c of the lid 11b bites into the gasket 12.

Whether or not the external terminal 14 is sufficiently pressed against the seat portion 15c of the internal terminal 15 is determined from the clamping force exerted by the horn 41 and the anvil 42. For example, if the necessary compression load is about 2000 N, the clamping force exerted by the pressing member 44, the horn 41, and the anvil 42 of the press 44a may be set to 2000 N. The clamping force exerted by the pressing member 44, the horn 41, and the anvil 42 may be controlled to 2000 N by, for example, measuring the reaction force acting on the member that supports the anvil. This guarantees the internal terminal 15 and the external terminal 14 to be pressed against each other so that they are brought into intimate contact with each other on the seat portion 15c, and also guarantees the protrusion 11c1 provided at the rim of the mounting hole 11c of the lid 11b to bite into the gasket 12.

Next, as described above, the pressing member 44 of the press 44a detaches the insulator 13 from the external terminal 14 in the region surrounding the seat portion 15c, and the horn 41 applies ultrasonic vibration to the external terminal 14 while pressing the external terminal 14 against the seat portion 15c of the internal terminal 15. As a result, the external terminal 14 and the seat portion 15c of the internal terminal 15, which are pressed against each other by being clamped by the horn 41 and the anvil 42 (supporting jig), are welded to each other. In this case, because the insulator 13 is detached from the external terminal 14 in the region surrounding the seat portion 15c as described above, the vibration transmitted from the horn 41 to the external terminal 14 is easily transmitted directly to the contact points between the external terminal 14 and the seat portion 15c of the internal terminal 15. Accordingly, within the external terminal 14 and the seat portion 15c of the internal terminal 15, the position that is clamped by the horn 41 and the anvil 42 (supporting jig) and is directly affected by the pressing force is welded. Thus, in the welding step, ultrasonic vibration may be applied to the internal terminal 15 or the external terminal 14 while detaching the insulator 13 from the external terminal 14 in at least the region surrounding the seat portion 15c and pressing the external terminal 14 and the seat portion 15c of the internal terminal 15 against each other.

Here, while checking the level of the pressing force applied from the horn 41 to the external terminal 14, ultrasonic vibration is applied to the horn 41 with a predetermined pressing force being applied to the external terminal 14. Then, the external terminal 14 is vibrated under the conditions where the internal terminal 15, the gasket 12, the lid 11b, the insulator 13, and the external terminal 14 are in intimate contact with each other and where the protrusion 11c1 provided at the rim of the mounting hole 11c of the lid 11b bites into the gasket 12. In this case, the internal terminal 15 pressed by the anvil 42 is fixed, and the external terminal 14 pressed by the horn 41 vibrates in synchronization with the horn 41. The vibration applied through the horn 41 to the external terminal 14 may preferably have a frequency such that the internal terminal 15 and the external terminal 14 can be solid-state welded. From this viewpoint, it is desirable that the vibration applied through the horn 41 to the external terminal 14 be, for example, from about 20 kHz to about 100 kHz.

In addition, it is desirable that the horn 41 be vibrated, for example, circumferentially about the center axis of the shaft portion 15d of the internal terminal 15. This ultrasonic vibration causes the joint interface between the external terminal 14 and the seat portion 15c of the internal terminal 15 to be solid-state welded. In other words, the internal terminal 15 and the external terminal 14 are welded together at a temperature lower than their melting temperature.

As a result, the external terminal 14 and the seat portion 15c of the internal terminal 15 should be welded, for example, around the shaft portion 15d of the internal terminal 15 along a circumferential direction. In other words, the welded portion 14d may be in a circular arcuate shape. In addition, the welded portion 14d should desirably have a certain area in order to obtain required strength. For example, the welded portion 14d may have an area of equal to or greater than 20 mm$^2$ (e.g., 30 mm$^2$).

In this embodiment, vibration is applied to the external terminal 14 through the horn 41, but this is merely illustrative. For example, although not shown in the drawings, it is also possible that the external terminal 14 may be held by an anvil, and a horn may be attached to the internal terminal 15, so that vibration can be applied through the horn to the internal terminal 15.

Thus, in the welding step, the seat portion 15c and the external terminal 14 are solid-state welded together by causing the external terminal 14 or the internal terminal 15 to vibrate while detaching the insulator 13 from the external terminal 14 in at least a region surrounding the seat portion 15c and pressing the external terminal 14 against the seat portion 15c of the internal terminal 15. The solid-state welding in this manner produces atomic level bonding between the external terminal 14 and the internal terminal 15 and provides sufficient electrical conductivity between the external terminal 14 and the internal terminal 15 at low resistance. In the welding step of this method, the insulator 13 is detached from the external terminal 14 in at least the region surrounding the seat portion 15c. Therefore, this method enables the external terminal 14 to be reliably pressed against the seat portion 15c of the internal terminal 15 when vibrating the external terminal 14 or the internal terminal 15. Because the insulator 13 is detached from the external terminal 14 in the region surrounding the seat portion 15c, the insulator 13 is unlikely to hinder the vibration, so the seat portion 15c and the external terminal 14 are solid-state welded at high quality.

Figure 7:
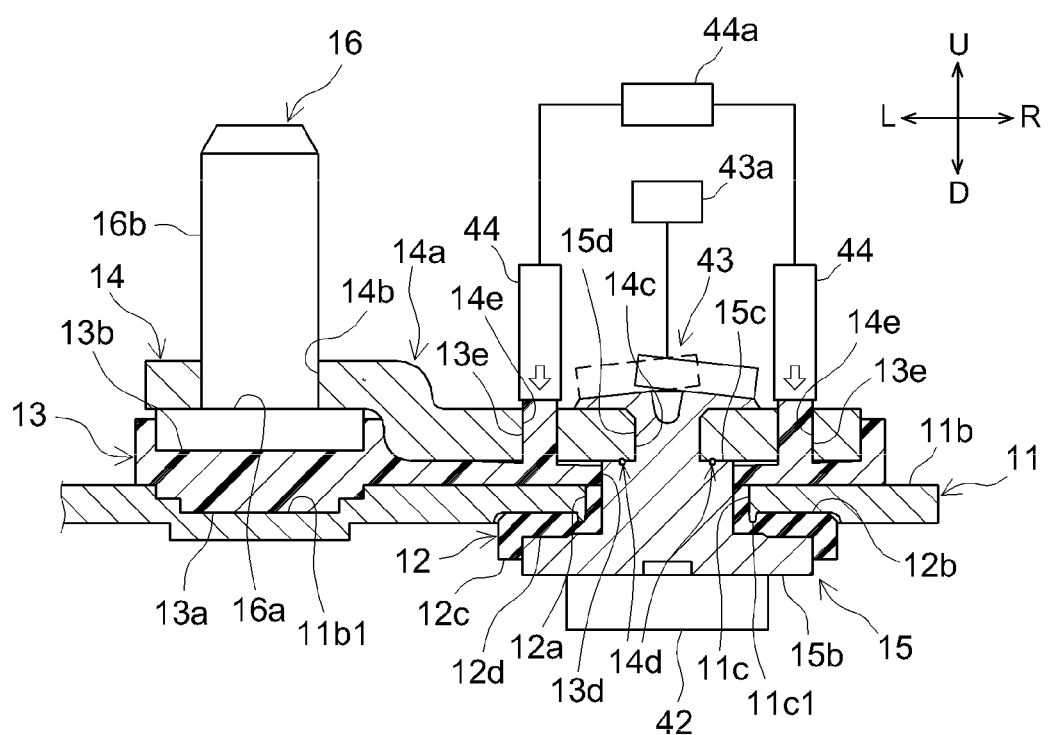
FIG. 7 is a cross-sectional view illustrating a fastening step.

FIG. 7 is a cross-sectional view illustrating the fastening step. In the fastening step, as illustrated in FIG. 7, the shaft portion 15d is fastened to a region around the insertion hole 14c of the external terminal 14 after the welding step. In this embodiment, as illustrated in FIG. 7, the horn 41, which has been used in the welding step, is removed, and a riveting tool member 43 is pressed against the tip end 15d1 of the shaft portion 15d of the internal terminal 15. The riveting tool member 43 is mounted to an actuator 43a, such as a servomotor, in such a manner that it is pressed against the tip end 15d1 of the shaft portion 15d of the internal terminal 15 as it rotates. In this fastening step as well, the insulator 13 may be detached from the external terminal 14 in at least a region surrounding the seat portion 15c. Then, after the fastening step, the insulator 13 may be released from being detached from the external terminal 14 in at least the region surrounding the seat portion 15c. More specifically, in the fastening step as well, the insulator 13 may be detached from the external terminal 14 in the region surrounding the seat portion 15c by the pressing member 44 of the press 44a. Then, after the fastening step, the pressing member 44 of the press 44a may be removed from the protrusion 13e of the insulator 13. Then, the pressing member 44 of the press 44a may release the protrusion 13e of the insulator 13 that has been pressed down by the pressing member 44.

Since the insulator 13 is detached from the external terminal 14 in at least the region surrounding the seat portion 15c in the fastening step in this way, the welded portion 14d produced in the welding step is not easily affected by the reaction force from the insulator 13. Then, under this condition, the tip end 15d1 of the shaft portion 15d of the internal terminal 15 is fastened to the region around the insertion hole 14c of the external terminal 14. As a result, the welded portion 14d produced in the welding step is maintained appropriately.

Although it is depicted schematically in FIG. 7, the fastening step may involve compressing and deforming the tip end 15d1 of the shaft portion 15d of the internal terminal 15 with a rotatable riveting tool member 43. After the fastening step, the pressing member 44 of the press 44a may be removed from the protrusion 13e. When the pressing member 44 of the press 44a is removed from the protrusion 13e, the insulator 13, the protrusions 13e of which have been pressed down, is caused to return to its original shape in the region surrounding the seat portion 15c, as illustrated in FIG. 2. This causes the insulator 13 to be sandwiched between the lid 11b and the external terminal 14.

In addition to the above-described solid-state welding, it is possible that the outer circumferential edge of the fastened shaft portion 15d of the internal terminal 15 may be additionally welded to the external terminal 14. This welding allows the internal terminal 15 and the external terminal 14 to be joined more firmly to each other. When the outer circumferential edge of the shaft portion 15d of the internal terminal 15 is additionally welded to the external terminal 14, the external terminal 14 and the internal terminal 15 are bonded at the atomic level in a greater region, so the electrical conductivity between the external terminal 14 and the internal terminal 15 can be further improved. The welding of the outer circumferential edge of the fastened shaft portion 15d of the internal terminal 15 may be carried out by laser welding.

Although embodiments of the battery 10, the manufacturing method of the battery 10, and the welding method of the welded portion 14d have been described hereinabove, the battery 10, the manufacturing method of the battery 10, and the welding method of the welded portion 14d are not limited to the embodiments described above.

Figure 8:
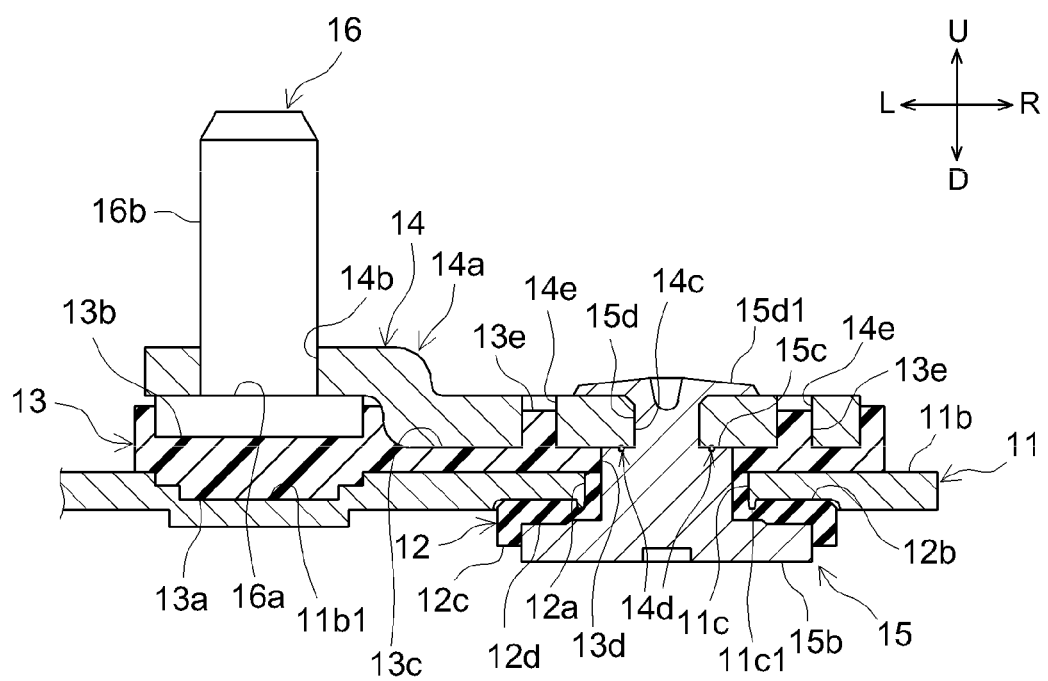
FIG. 8 is a cross-sectional view illustrating a battery according to another embodiment of the disclosure.

Here, FIG. 8 is a cross-sectional view illustrating a battery according to another embodiment of the disclosure. FIG. 8 shows a portion of the battery in which an external terminal 14 and an internal terminal 15 are fitted to a battery case 11. In the embodiment shown in FIG. 8, the external terminal 14 includes a through hole 14e in a vicinity of the portion of the external terminal 14 that overlaps the seat portion 15c. The insulator 13 includes a protrusion 13e protruding into the through hole 14e. In this embodiment, the protrusion 13e protrudes into the through hole 14e, but it does not protrude from the through hole 14e. As illustrated in FIG. 8, the protrusion 13e of the insulator 13 may protrude to an intermediate portion of the through hole 14e, or may protrude to a position such as not to protrude from the through hole 14e. In the welding step, a rod or the like may be inserted into the through hole 14e to press down the protrusion 13e. Thereby, the insulator 13 is detached from the external terminal 14 in a region surrounding the seat portion 15c of the internal terminal 15. Therefore, in the welding step in which the seat portion 15c and the external terminal 14 are solid-state welded to each other by causing the external terminal 14 or internal terminal 15 to vibrate, the insulator 13 is unlikely to hinder the vibration produced in the external terminal 14 or the internal terminal 15. As in the embodiment shown in FIG. 2, the seat portion 15c and the external terminal 14 are solid-state welded to each other more reliably.

Figure 9:
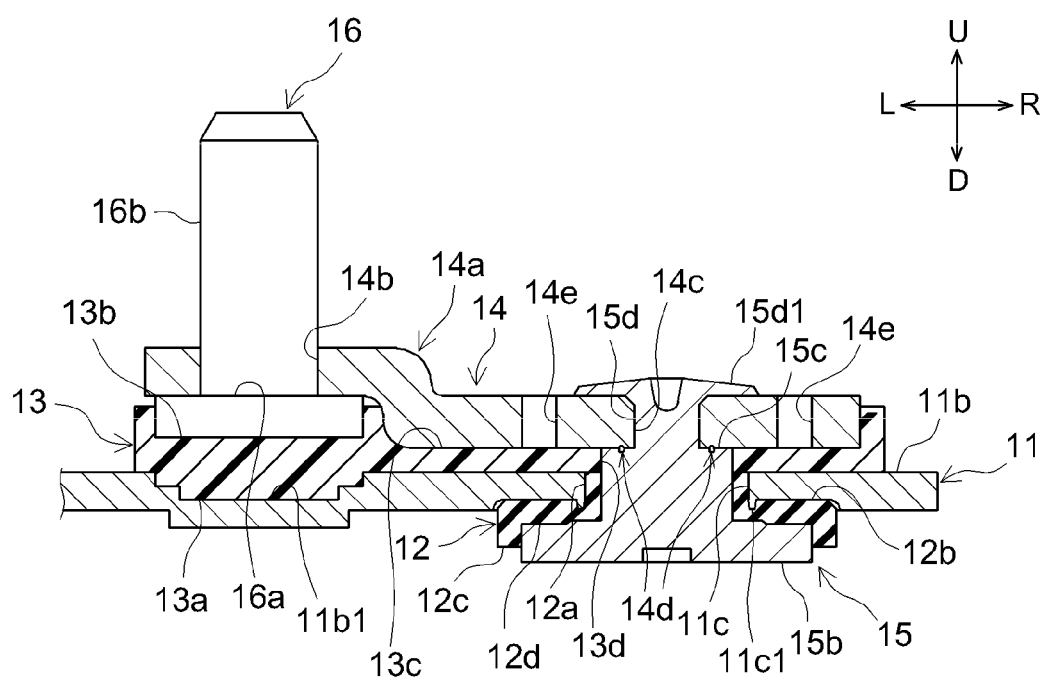
FIG. 9 is a cross-sectional view illustrating a battery according to still another embodiment of the disclosure.

FIG. 9 is a cross-sectional view illustrating a battery according to still another embodiment of the disclosure. In the embodiment shown in FIG. 9, the external terminal 14 includes a through hole 14e in a vicinity of the portion of the external terminal 14 that overlaps the seat portion 15c. In this embodiment, the protrusion 13e (see FIGS. 2 and 8) that protrudes into the through hole 14e is eliminated from the insulator 13. In the welding step, a rod or the like may be inserted into the through hole 14e to press down the insulator 13. Thereby, the insulator 13 is detached from the external terminal 14 in a region surrounding the seat portion 15c of the internal terminal 15. Therefore, in the welding step in which the seat portion 15c and the external terminal 14 are solid-state welded to each other by causing the external terminal 14 or internal terminal 15 to vibrate, the insulator 13 is unlikely to hinder the vibration produced in the external terminal 14 or the internal terminal 15. As in the embodiment shown in FIG. 2, the seat portion 15c and the external terminal 14 are solid-state welded to each other more reliably.

Figure 10:
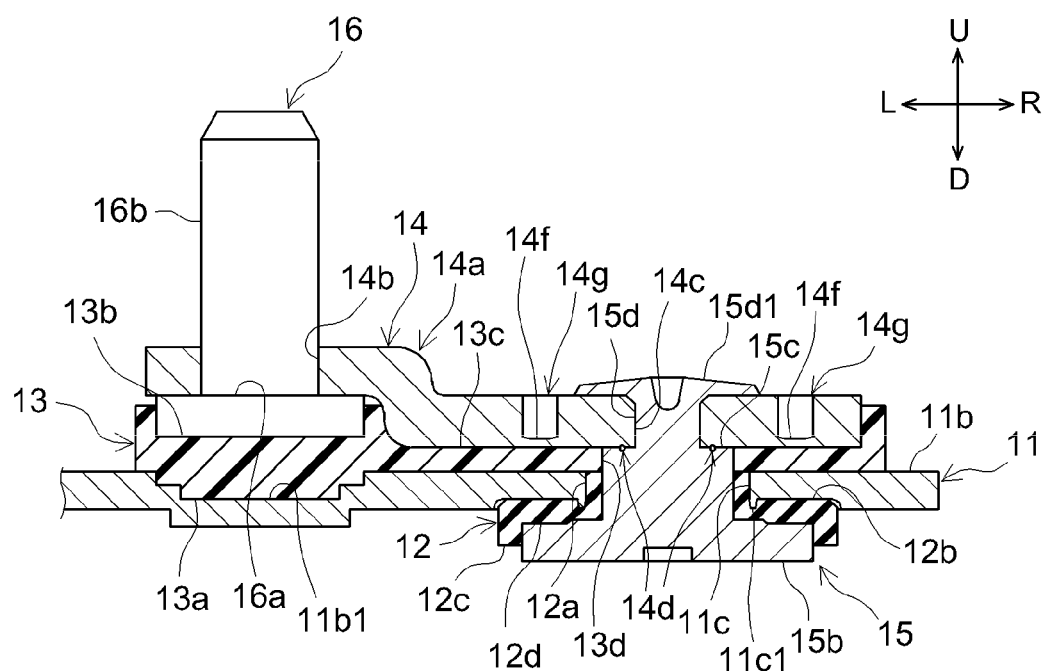
FIG. 10 is a cross-sectional view illustrating a battery according to yet another embodiment of the disclosure.

FIG. 10 is a cross-sectional view illustrating a battery according to yet another embodiment of the disclosure. In the embodiment shown in FIG. 10, the external terminal 14 includes a thinned portion 14f in a region surrounding a portion of the external terminal 14 that overlaps the seat portion 15c. Referring to FIG. 10, the external terminal 14 is formed with holes 14g in a vicinity of the portion of the external terminal 14 that overlaps the seat portion 15c, and a thinned portion 14f is provided at the bottom portion of each of the holes 14g. Provision of the thinned portion 14f enables the welded portion 14d to be isolated from the air and to provide a sufficient distance between the welded portion 14d and the air. Provision of the thinned portion 14f prevents water or extraneous matters from entering between the external terminal 14 and the insulator 13. As a result, it is easy to maintain the quality of the solid-state welding at high level. It is desirable that the thinned portion 14f be designed to have a strength such that it is not punctured when pressed down by a rod. It is desirable to provide a thinner portion at a central portion of the thinned portion 14f and a thicker portion around the central portion. In other words, the thinned portion 14f may be designed so that its thickness reduces gradually toward the central portion.

In this embodiment, it is desirable that in the welding step, a rod or the like be inserted into the hole 14g provided with the thinned portion 14f so that the insulator 13 is pressed down. Thereby, the insulator 13 is detached from the external terminal 14 in a region surrounding the seat portion 15c of the internal terminal 15. Therefore, in the welding step in which the seat portion 15c and the external terminal 14 are solid-state welded to each other by causing the external terminal 14 or internal terminal 15 to vibrate, the insulator 13 is unlikely to hinder the vibration produced in the external terminal 14 or the internal terminal 15. As in the embodiment shown in FIG. 2, the seat portion 15c and the external terminal 14 are solid-state welded to each other more reliably.

Figure 11:
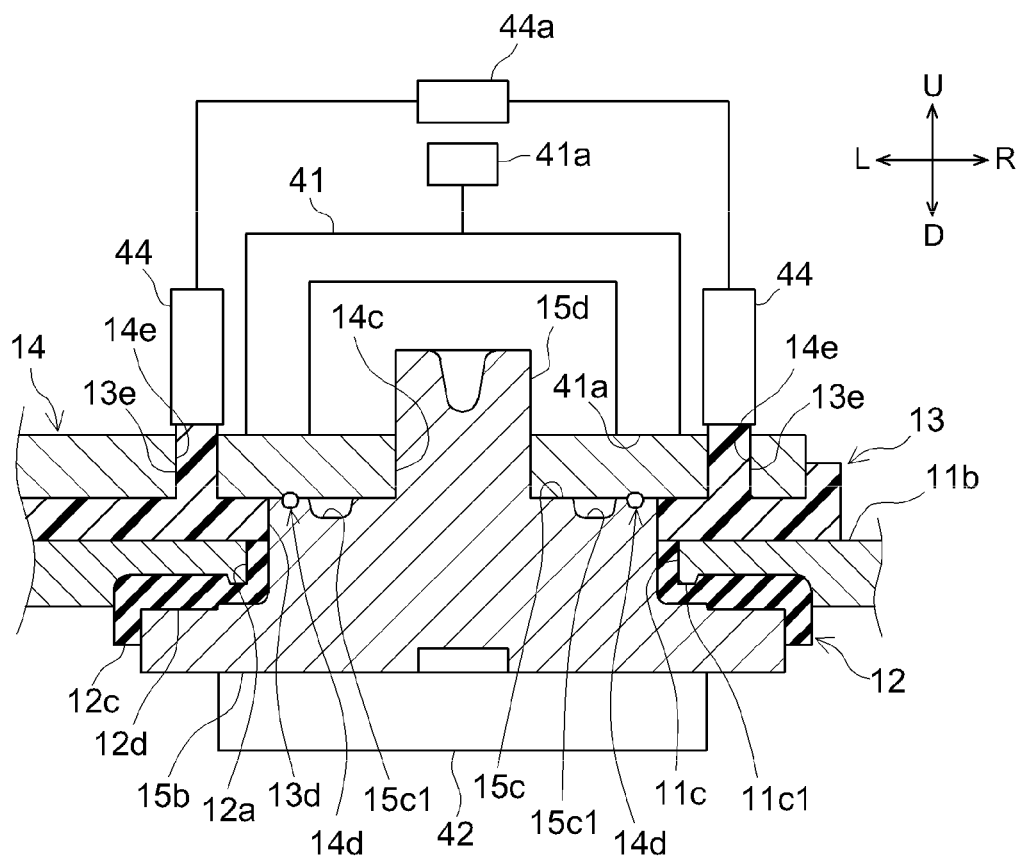
FIG. 11 is a cross-sectional view illustrating a battery according to further another embodiment of the disclosure.
Figure 12:
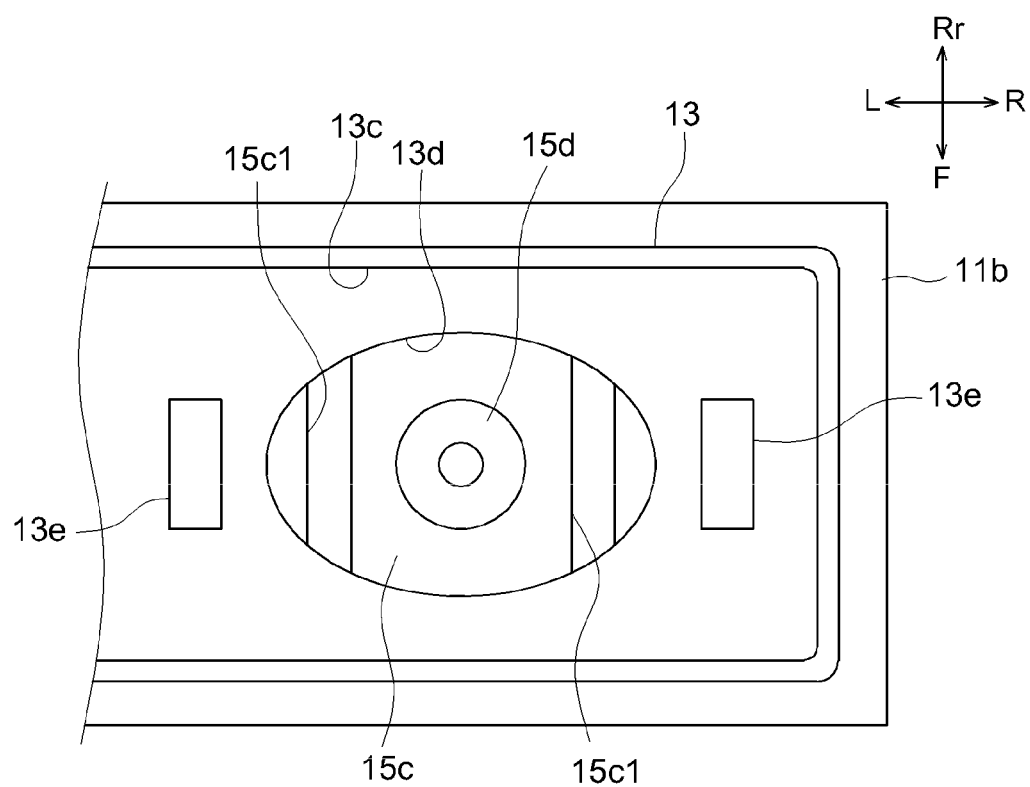
FIG. 12 is a plan view of the internal terminal 15, illustrating how the insulator 13 is fitted to the seat portion 15c of the internal terminal 15 in the assembling step of the battery according to the embodiment shown in FIG. 11.

FIG. 11 is a cross-sectional view illustrating a welding step of a battery according to further another embodiment of the disclosure. FIG. 12 is a plan view of an internal terminal 15, illustrating how an insulator 13 is fitted to a seat portion 15c of the internal terminal 15 in an assembling step of the battery of the embodiment shown in FIG. 11.

For example, as illustrated in FIGS. 11 and 12, the welded portion 14d, at which the external terminal 14 is welded to the internal terminal 15, may be provided radially outward relative to the portion of the shaft portion 15d that is fastened to the region around the insertion hole 14c of the external terminal 14 (in other words, radially outward relative to the shaft portion 15d). In the embodiment shown in FIGS. 11 and 12, the seat portion 15c of the internal terminal 15 is in an elliptic shape the major axis of which is set along the longitudinal axis of the lid 11b. In addition, the seat portion 15c of the internal terminal 15, to which the external terminal 14 is to be joined, is provided with grooves 15c1. In the welding step, the horn 41 is placed onto two points that are spaced part along the major axis of the seat portion 15c of the internal terminal 15, for example, as illustrated in FIG. 11. With respect to the major axis of the seat portion 15c of the internal terminal 15, each of the grooves 15c1 is formed inward relative to the positions on which the horn 41 is to be placed. Furthermore, through holes 14e are formed in the external terminal 14. With respect to the major axis of the seat portion 15c of the internal terminal 15, the through holes 14e are formed outward relative to the positions on which the horn 41 is placed. The insulator 13 is provided with protrusions 13e protruding into the through holes 14e.

In the welding step of this embodiment, the protrusions 13e should be pressed down so that the insulator 13 is detached from the external terminal 14 in the region surrounding the seat portion 15c. In particular, the insulator 13 should be pressed down and detached from the external terminal 14 in a vicinity directly below the position on which the horn 41 is to be placed. Then, while the insulator 13 is detached from the external terminal 14 in the region surrounding the seat portion 15c, the horn 41 may cause the external terminal 14 to be pressed against the internal terminal 15, and may also apply ultrasonic vibration to the external terminal 14. Thus, the external terminal 14 and the internal terminal 15 are solid-state welded to each other in a region where the external terminal 14 is pressed against the internal terminal 15 by the horn 41. Thereafter, although not shown in the drawings, the protrusions 13e are pressed down and the insulator 13 is detached from the external terminal 14 in the region surrounding the seat portion 15c. Then, while the insulator 13 is detached from the external terminal 14 in the region surrounding the seat portion 15c, the shaft portion 15d of the internal terminal 15 may be fastened to a region around the insertion hole 14c of the external terminal 14.

In this embodiment, the grooves 15c1 are formed in the seat portion 15c of the internal terminal 15 to which the external terminal 14 is to be joined. When fitting the external terminal 14 onto the seat portion 15c, it is possible that extraneous matters may be caught between the seat portion 15c and the external terminal 14. When this occurs, the grooves 15c1 formed in the seat portion 15c allow the extraneous matters to fall into the grooves 15c1. This further enhances the reliability of welding of the seat portion 15c and the external terminal 14. As illustrated in FIG. 11, for example, the groove 15c1 may be provided inward relative to the position at which the external terminal 14 is pressed by the horn 41, with respect to the radial axis of the shaft portion 15d of the internal terminal 15. That is, it is desirable that, with respect to the radial axis of the shaft portion 15d, the groove 15c1 be formed at a position in the seat portion 15c that is closer to the shaft portion 15d than the welded portion 14d, at which the external terminal 14 is welded to the seat portion 15c of the internal terminal 15. In other words, it is desirable that the groove 15c1 be formed at a position in the seat portion 15c that is close to the insertion hole 14c of the external terminal 14, through which the shaft portion 15d is inserted.

It is desirable that each of the grooves 15c1 in the seat portion 15c be formed so that an extraneous matter with a size of about 50 μm to about 200 μm can fall therein when the external terminal 14 is fitted to the seat portion 15c. From this viewpoint, it is desirable that each of the grooves 15c1 have a depth of from about 200 μm to about 500 μm. From this viewpoint, it is desirable that each of the grooves 15c1 have a width of from about 200 μm to about 2 mm. In the example of FIG. 12, each of the grooves 15c1 is formed in a straight line shape. However, the shape of the groove 15c1 is not limited to any particular shape.

Although this embodiment shows that the fastening step is performed after the welding step, it is also possible that the fastening step may be performed during the welding step. Specifically, it is possible to place a riveting tool member onto the shaft portion 15d of the internal terminal 15 and fasten the shaft portion 15d of the internal terminal 15 to a region around the insertion hole 14c of the external terminal 14 while the horn 41 is pressing the external terminal 14 against the internal terminal 15 and is applying ultrasonic vibration to the external terminal 14.

Figure 13:
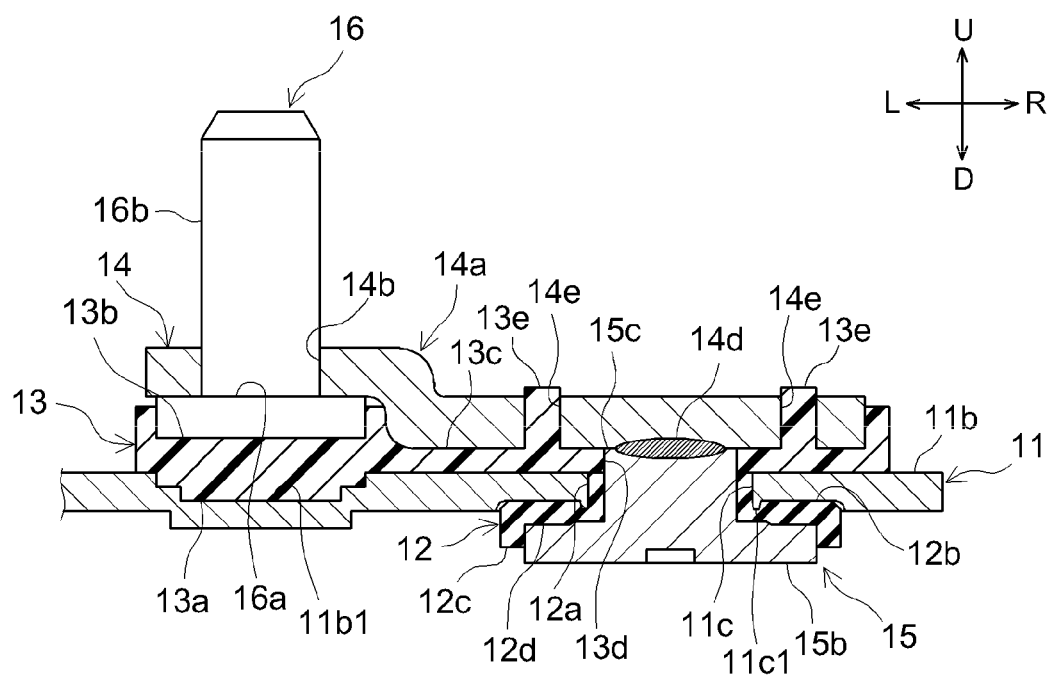
FIG. 13 is a cross-sectional view illustrating another embodiment of the battery according to the present disclosure.

FIG. 13 is a cross-sectional view illustrating another embodiment of the battery according to the present disclosure. In the embodiment shown in FIG. 13, the external terminal 14 is overlapped and welded to the seat portion 15c of the internal terminal 15. The seat portion 15c provided here is inserted through the mounting hole 11c and fitted into the lid 11b (battery case component) with the gasket 12 and the insulator 13, serving as the insulating members, being interposed between the seat portion 15c and the lid 11b. The external terminal 14 overlaps the seat portion 15c inserted through the mounting hole 11c and includes the welded portion 14d welded to the internal terminal 15 in the portion of the external terminal 14 that overlaps the seat portion 15c.

In the embodiment shown in FIG. 13, the tubular portion 12a of the gasket 12 is fitted to the mounting hole 11c of the lid 11b in the assembling step of assembling together the internal terminal 15, the gasket 12, the lid 11b, the insulator 13, and the external terminal 14. The seat portion 15c of the internal terminal 15 is fitted into the tubular portion 12a of the gasket 12. The insulator 13 is disposed on the outer surface of the lid 11b while fitting the seat portion 15c to the through hole 13d. The external terminal 14 is disposed so as to overlap the seat portion 15c above the insulator 13.

As illustrated in FIG. 13, the external terminal 14 includes through holes 14e in a vicinity of the portion of the external terminal 14 that overlaps the seat portion 15c. The insulator 13 is provided with protrusions 13e that protrude into through holes 14e. Although not shown in the drawings, each of the protrusions 13e may be pressed down by the pressing member 44 of the press 44a in the welding step. Thereby, the insulator 13 is detached from the external terminal 14 in a region surrounding the seat portion 15c of the internal terminal 15. Moreover, in the welding step in which the seat portion 15c and the external terminal 14 are solid-state welded to each other by causing the external terminal 14 or internal terminal 15 to vibrate, the insulator 13 is unlikely to hinder the vibration produced in the external terminal 14 or the internal terminal 15.

In the embodiment shown in FIG. 13, the external terminal 14 is overlapped over a wide area of the seat portion 15c. As a result, the internal terminal 15 and the external terminal 14 are solid-state welded over a wide area. The solid-state welding should desirably be carried out by pressing a horn against the external terminal 14 and pressing an anvil against the base portion 15b of the internal terminal 15 at the position corresponding to the horn. Then, the external terminal 14 may be pressed against the seat portion 15c of the internal terminal 15 by the horn and the anvil, and the external terminal 14 may be caused to vibrate by the horn. In the battery according to the embodiment shown in FIG. 13, the internal terminal 15 and the external terminal 14 are solid-state welded over a wide area, and by the solid-state welded portion 14d, the internal terminal 15 and the external terminal 14 are joined at a required strength.

That is, the shaft portion 15d (see FIG. 2) is eliminated from the seat portion 15c. Also, the insertion hole 14c (see FIG. 2) through which the shaft portion 15d is to be inserted is eliminated from the external terminal 14. This is different from the embodiment in which the shaft portion 15d is fastened to a region surrounding the insertion hole 14c of the external terminal 14. However, the external terminal 14 is welded to a wide area of the seat portion 15c of the internal terminal 15, whereby the external terminal 14 and the internal terminal 15 are welded to each other at a required strength.

It is also possible that the upper surface of the seat portion 15c may be provided with a groove (see FIG. 11) for allowing extraneous matters to fall therein at an appropriate position, although it is not employed in the example shown in FIG. 13.

As has been discussed above, the battery 10 proposed herein embodies welding the internal terminal 15 and the external terminal 14 to each other, without use of laser welding, in the welding step for providing a conductive path between the internal terminal 15 and the external terminal 14. Moreover, the conductive path between the internal terminal 15 and the external terminal 14 is formed in a contact portion between the internal terminal 15 and the external terminal 14 that is not exposed outside. This makes it possible to maintain the quality of the conductive path between the internal terminal 15 and the external terminal 14 at high level. Furthermore, the equipment cost can be reduced because the welding step for forming the conductive path between the internal terminal and the external terminal uses a solid-state welding machine, which is relatively less costly than a laser welding machine.

Various embodiments of the battery and the method of manufacturing a battery module have been described hereinabove according to the present disclosure. Unless specifically stated otherwise, the embodiments of the battery and the method of manufacturing the battery described herein do not limit the scope of the present invention.

For example, unless otherwise stated, the structure of the battery case and that of the electrode assembly are not limited to those described in the foregoing embodiments.

For example, in the foregoing embodiments, the internal terminal 15 and the external terminal 14 are mounted to the lid 11b, which is a battery case component. However, depending on the structure of the battery case, this is not necessarily the case. In other words, the battery case component is not limited to the lid. It is possible that the internal terminal 15 and the external terminal 14 may be mounted to the case main body in which the electrode assembly is enclosed. In that case, the case main body may be the battery case component. Although the foregoing embodiments show the gasket 12 and the insulator 13 as examples of the insulating member, the insulating member is not limited thereto and may be interposed between the internal terminal 15 and a battery case component and between the external terminal 14 and the battery case component.

What is claimed is:

1. A method of manufacturing a battery, comprising the steps of:
   preparing a battery case component including a mounting hole;
   preparing a gasket including a tubular portion attachable to the mounting hole;
   preparing an internal terminal including a seat portion attachable to the tubular portion;
   preparing an insulator including a first through hole attachable to the tubular portion;
   preparing an external terminal to be disposed on the insulator, the external terminal including a portion that overlaps the seat portion;
   assembling together the internal terminal, the gasket, the battery case component, the insulator, and the external terminal in such a manner that the tubular portion of the gasket is attached to the mounting hole of the battery case component, the seat portion of the internal terminal is attached to the tubular portion of the gasket, the insulator is disposed on an outer surface of the battery case component, and the external terminal is disposed on the insulator so as to overlap the seat portion; and
   welding the seat portion and the external terminal together, by causing the external terminal or the internal terminal to vibrate while detaching the insulator from the external terminal in at least a region surrounding the seat portion and pressing the external terminal against the seat portion of the internal terminal, to solid-state weld the seat portion and the external terminal together.

2. The method according to claim 1, wherein:
   the external terminal includes a second through hole formed in a vicinity of the portion of the external terminal that overlaps the seat portion; and
   in the welding step, the insulator is pressed down through the second through hole to detach the insulator from the external terminal.

3. The method according to claim 1, wherein:
   the external terminal includes a second through hole formed in a vicinity of the portion of the external terminal that overlaps the seat portion; and
   the insulator includes a protrusion protruding into the second through hole;
   in the assembling step, the protrusion of the insulator is inserted into the second through hole;
   in the welding step, the protrusion is pressed down to detach the insulator from the external terminal in the region surrounding the seat portion.

4. The method according to claim 3, wherein the protrusion protrudes from the second through hole with the external terminal being pressed against the seat portion of the internal terminal.

5. The method according to claim 1, wherein:
   the external terminal includes a thinned portion having a reduced thickness and provided in the portion of the external terminal that overlaps the seat portion; and
   in the welding step, the thinned portion is pressed down to detach the insulator from the external terminal in the region surrounding the seat portion.

6. The method according to claim 1, wherein:
   the internal terminal prepared in the step of preparing an internal terminal includes a shaft portion rising from the seat portion;
   the external terminal prepared in the step of preparing an external terminal includes a insertion hole through which the shaft portion is inserted;
   in the assembling step, the external terminal is disposed on the insulator so that the shaft portion is inserted through the insertion hole;
   the method further comprises, after or during the welding step, fastening the shaft portion to a region around the insertion hole, with the insulator being detached from the external terminal in at least the region surrounding the seat portion; and
   after the fastening step, the insulator is released from being detached from the external terminal in at least the region surrounding the seat portion.

7. The method according to claim 1, wherein, in the welding step, ultrasonic vibrations are applied to the internal terminal or the external terminal while clamping the internal terminal and the external terminal with a horn and an anvil, and pressing the external terminal and the seat portion of the internal terminal against each other.

* * * * *